United States Patent [19]

Kunimune et al.

[11] Patent Number: 4,656,238

[45] Date of Patent: Apr. 7, 1987

[54] SOLUBLE POLYIMIDE-SILOXANE PRECURSOR, PROCESS FOR PRODUCING SAME, AND CROSS-LINKED POLYIMIDE-SILOXANE

[75] Inventors: Kouichi Kunimune, Ichiharashi; Yoshiya Kutsuzawa, Yokohamashi; Shiro Konotsune, Yokosukashi, all of Japan

[73] Assignee: Chisso Corporation, Osaka, Japan

[21] Appl. No.: 779,433

[22] Filed: Sep. 24, 1985

[30] Foreign Application Priority Data

Feb. 11, 1984 [JP] Japan ................................ 59-230428

[51] Int. Cl.$^4$ ............................................. C08G 77/54
[52] U.S. Cl. ........................................ 528/26; 525/436
[58] Field of Search ....................... 528/26, 27; 525/436

[56] References Cited

U.S. PATENT DOCUMENTS 3,948,835  4/1976  Greber et al. .......................... 528/26
3,950,308  4/1976  Greber et al. .......................... 528/26

*Primary Examiner*—Veronica P. Hoke
*Attorney, Agent, or Firm*—Fred Philpitt

[57] ABSTRACT

A novel soluble polyimide-siloxane precursor useful for forming a superior coating on silicon wafer, glass, etc. and a process for producing the same are provided, which precursor has an imide-amic acid chain part expressed by $-R^3\text{-}[(I)-R^2-(I)]_{\overline{n}}R^3-$, bonded by a bonding structure expressed by $-SiR^4{}_{3-m}Y^1{}_{m-1}-O-SiR^4{}_{3-m}Y^1{}_{m-1}-$, wherein (I) is either one of formulas (2), (3) or (4)

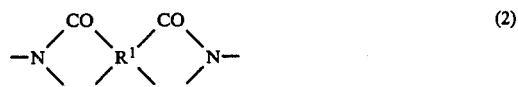

(2)

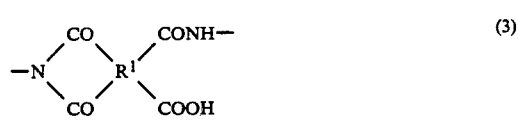

(3)

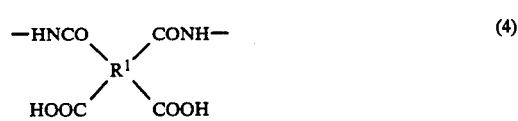

(4)

wherein $R^1$ is a tetravalent carbocyclic aromatic group; $R^2$, $R^3$, $R^4$ and $Y^1$ each are a specified group; $1 \leq m \leq 3$; the precursor further being terminated by $Y^2{}_m R^4{}_{3-m}Si-$ wherein $Y^2$ is a specified group and having a percentage imidization as defined relative to the quantities of (2), (3) and (4), of 50–100% and also an inherent viscosity as specifically defined, of 0.05 to 5 dl/g, the above n being an integer defined so as to give the above inherent viscosity value.

5 Claims, 1 Drawing Figure

SOLUBLE POLYIMIDE-SILOXANE PRECURSOR, PROCESS FOR PRODUCING SAME, AND CROSS-LINKED POLYIMIDE-SILOXANE

BACKGROUND OF THE INVENTION

This invention relates to a novel polyimide-siloxane precursor and a process for producing the same.

Polyimide resins have so far been widely used for protecting materials, insulating materials and adhesives in the field of electronic equipments or films, structural materials, etc., mainly in the aspect of heat resistance. The process of using the resins has relied, in most cases, on a process of applying a precursor prior to forming a cross-linked polymer, as it is, onto an object, followed by baking to thereby complete imidization and also effect cross-linking, and various proposals have been made for improving the above-mentioned various functions and effects after baking. Such prior art, however, cannot always be said to sufficiently satisfy current diversificated, indivisualized and sophisticated needs.

For example, polyamic acids which have so far been used for a polyimide precursor for electronic materials have been applied in the form of their solution on a substrate, followed by baking to effect imidization and curing, but at the time of their use, various problems (drawbacks) have been raised that the coating solution therefrom has a very high viscosity to make coating workability inferior; baking requires as high a temperature as 300°~400° C. which often exceeds the heat-resistant temperature of substrates; adhesion of the coating solution onto silicon wafer, glass, etc. is insufficient; etc.

As to such adhesion among these problem, a number of copolymers of polyamic acid with silicon compounds have been proposed for improving the adhesion. For example, Japanese patent application laid-open Nos. Sho 57-143328/1982, Sho 58-7473/1983 and Sho 58-13631/1983 propose a technique that a polyimide precursor obtained by replacing a portion of a diamine component as raw material by a polysiloxane terminated with diamines at both the ends thereof is used to prepare a polyimide-siloxane copolymer. In this case, however, a problem has been raised that in place of improving the adhesion to a certain extent, heat resistance lowers with the increase of the siloxane content in the resulting copolymer and also the polymerization degree decreases to lower the coating-formability. Further, Japanese patent publication Nos. Sho 58-32162/1983 and Sho 58-32163/1983 disclose a process wherein a suitable carboxylic acid derivative such as tetracarboxylic acid dianhydrides is reacted with a diamine, to form a polyamidecarboxylic acid having a terminal group such as acid anhydrides, followed by reacting this polyamidecarboxylic acid with an aminosilicon compound at $-20°$ C. to $+50°$C., to obtain a silicon-containing polyamidecarboxylic acid prepolymer (a precursor), which is not imidized or imidized (chemically cyclized) under mild conditions (low temperature, preferably 50° C. or lower, particularly $-20°$ C. to $+25°$ C.) in the presence of a dehydrating agent to form an organosilicon-modified polyimide precursor, followed by heating the former unimidized precursor or the latter polyimide precursor in the form of solution in the presence or absence of a silane diol or a siloxane diol to effect completion of imidization and also cross-linking to thereby obtain a polyimide-siloxane precursor. However, this polyimide-siloxane precursor has raised various problems that it requires to bake it at a high temperature of about 200° C. or higher, up to 350° C. for its imidization as in the case of conventional polyimide precursor composed mainly of polyamidecarboxylic acid; if the resulting cyclized substance has a high silicon content, the coating formability is inferior, while if it has a low silicon content, adhesion onto silicon wafer, glass, etc. is inferior; and in the case where a preimidized polyimide-siloxane precursor is prepared, cyclization by low temperature treatment in the presence of a dehydrating agent requires a long time and hence this is not practical, while if cyclization is promoted by heating, the whole solution gels to lose fluidity.

In view of the above various problems of the prior art, it has been desired to develop a precursor which is soluble in a suitable solvent; has a suitable viscosity in the form of solution to afford good operability; can be baked and cured at a relatively low temperature and for a relatively short time and has a good coating-formability; and has superior adhesion onto silicon wafer, glass, etc., so that the resulting solution may be suitable to surface-protection of semiconductors, insulating film between multilayer interconnections, etc.

The object of the present invention is to provide such a soluble polyimide-siloxane precursor having overcome the above problems (in a first aspect) and a process for producing the same (in a second aspect).

SUMMARY OF THE INVENTION

The present invention in a first aspect resides in:

a soluble polyimide-siloxane precursor having an imide-amic acid chain part expressed by the formula (1)

bonded by a bonding structure expressed by the formula (5)

wherein said (I)s in the number of n+1 represent independently either one of constituting units expressed by the following formulas (2), (3) and (4):

wherein $R^1$ represents a tetravalent carbocyclic aromatic group;

$R^2$ represents an aliphatic group of 2 to 12 carbon atoms, an alicyclic group of 4 to 30 carbon atoms, an arylaliphatic group of 6 to 30 carbon atoms or a carbocyclic aryl group of 6 to 30 carbon atoms;

$R^3$s independently represent $-(CH_2)_s-$, wherein s represents an integer of 1 to 4;
n is defined later;
$R^4$s independently represent an alkyl group of 1 to 6 carbon atoms, phenyl group or an alkyl-substituted phenyl group of 7 to 12 carbon atoms;
$Y^1$s independently represent an alkoxy group, acetoxy group, halogen atom, hydroxyl group, $(-O-)_{\frac{1}{2}}$ or a group expressed by the following formula (6)

$$R^5R^6R^7Si-O- \qquad (6)$$

wherein $R^5$, $R^6$ and $R^7$ independently represent an alkyl group of 1 to 6 carbon atoms, phenyl group or an alkyl-substituted phenyl group of 7 to 12 carbon atoms; and
ms independently represent an integer of $1 \leq m \leq 3$; said soluble polyimide-siloxane precursor further being terminated by a group expressed by the following formula (7):

$$Y^2_m R^4_{3-m} Si- \qquad (7)$$

wherein $Y^2$s independently represent an alkoxy group, acetoxy group, halogen atom, hydroxyl group or a group expressed by said formula (6); $R^4$ and m are as defined in said formula (5);
and having a percentage imidization T of 50 to 100%, this T being defined in terms of the whole of the molecule by the following equation (8):

$$T = \frac{(2W+P) \times 100}{2W + 2P + 2Q} \,(\%) \qquad (8)$$

wherein
W: the total number of constituting units expressed by said formula (2);
P: the total number of constituting units expressed by said formula (3) and
Q: the total number of constituting units expressed by said formula (4);
and also having a relation expressed by the following expression (9):

$$0.1 \leq \frac{D^1}{B^1 + D^1} \qquad (9)$$

wherein
$B^1$: the total number of $R^2$s, and
$D^1$: the total number of $R^3$s;
and further having an inherent viscosity of 0.05 to 5 dl/g as measured in a concentration of 0.5 g/dl in N-methyl-2-pyrrolidone at a temperature of $30° \pm 0.01°$ C.;
said n being an integer defined so as to give an inherent viscosity of said soluble polyimide-siloxane precursor of 0.05 to 5 dl/g.

The present invention in a second aspect resides in:
a process for producing a soluble polyimide-siloxane precursor, which comprises
a first step of reacting A mols of a tetracarboxylic acid dianhydride expressed by the following formula (10), $B^2$ mols of a diamine expressed by the following formula (11) and $D^2$ mols of an aminosilicon compound expressed by the following formula (12), A, $B^2$ and $D^2$ satisfying the following expression (14) and also approximately satisfying the following equation (15),
in the presence of a solvent at a temperature of 0° to 60° C. for a time of 0.2 to 6 hours to effect a uniform reaction; and
a second step of heating the resulting reaction material in the presence of E mols of a silylating agent expressed by the following formula (13) in the range expressed by the following expression (16) at a temperature of 60° to 200° C. for a time of 0.5 to 30 hours to effect an imidization reaction, and hydrolyzing $X^1$ in said aminosilicon compound expressed by the formula (12) and $X^2$ in said silylating agent expressed by the formula (13), with water generated during said imidization reaction and if necessary, water from other sources, and further effecting siloxane condensation,
to make the percentage imidization T of the resulting product defined by the following equation (17), 50 to 100%, and also make the inherent viscosity thereof as measured in N-methyl-2-pyrrolidone in a concentration of 0.5 g/dl at a temperature of $30° \pm 0.01°$ C., 0.05 to 5 dl/g:

$$H_2N-R^2-NH_2 \qquad (11)$$

$$H_2N-R^3-SiR^4_{3-m}X^1_m \qquad (12)$$

$$R^5R^6R^7SiX^2 \qquad (13)$$

$$0.1 \leq \frac{D^2}{B^2 + D^2} \qquad (14)$$

$$2A = 2B^2 + D^2 \qquad (15)$$

$$0.01 \leq E/(D^2 \times m) \leq 1 \qquad (16)$$

wherein $R^1$, $R^2$, $R^3$, $R^4$, $R^5$, $R^6$, $R^7$ and m are as defined above in the first aspect of the present invention; $X^1$ represents an alkoxy group, acetoxy group or a halogen atom; and $X^2$ represents an alkoxy group, acetoxy group, a halogen atom or hydroxyl group;

$$T = \frac{(2W+P) \times 100}{2W + 2P + 2Q} \,(\%) \qquad (17)$$

wherein W, P and Q each represent the total number in the molecule, of the following three kinds of constituting units formed by reaction of the tetracarboxylic acid dianhydride with the diamine and/or the aminosilicon, and further, dehydration or non-dehydration:

Q

DETAILED DESCRIPTION OF PREFERRED EMBODIMENTS

The soluble polyimide-siloxane precursor of the present invention in the first aspect is an oligomer or polymer having an imide-amic acid chain part expressed by the formula (1) (hereinafter abbreviated often to imide-amic acid chain part (1); those expressed by other formulas, often similarly abbreviated), cross-linked or extended through bonding by means of a bonding structure expressed by the formula (5) to form a skeleton, and being terminated with a group expressed by the formula (7).

$R^1$ has preferably at least one six-membered ring. $R^1$ is particularly, monocyclic aryl group, condensed polycyclic aryl group or polycyclic aryl group having a few condensed rings or non-condensed rings (these rings being combined with each other directly or through a cross-linking group). Examples of such cross-linking group is —O—, —CO—, —$SO_2$—.

Examples of $R^1$ are wherein $R^8$ represents —O—, —CO— or —$SO_2$, and when it has two or more aromatic rings (including condensed ring), the bonds of the respective rings are at o-position to each other.

Examples of $R^2$ are wherein $R^9$ represents an alkyl group of 1 to 4 carbon atoms;

wherein $R^{10}$ represents —O—, —S—, —$SO_2$—, —CO—, —$CH_2$— or

—$(CH_2)_p$— wherein p represents an integer of 2 to 12; and

The precursor of the present invention has a suitable range of molecular weight defined in terms of an inherent viscosity of 0.05 to 5 dl/g as measured under specified conditions, and is soluble in a suitable solvent.

The above inherent viscosity ($\eta$ inh) is expressed by the following equation:

$$\eta\ inh = \frac{\ln \eta/\eta_0}{c}$$

wherein $\eta$ is a value measured by Ubbellohde viscometer in N-methyl-2-pyrrolidone as solvent in a concentration of 0.5 g/dl at a temperature of 30°±0.01° C.; $\eta_0$ is a value of the solvent measured by Ubbellohde viscometer at the same temperature; and c is a concentration of 0.5 g/dl.

When the respective total numbers of $R^2$ and $R^3$ in the molecule, of the above imide-amic acid chain part (1) are referred to as $B^1$ and $D^1$, respectively, the suitable range of $D^1/(B^1+D^1)$ is larger than or equal to 0.1 (see the above equation (9)). If the total number of $R^3$ (i.e. $D^1$) is so small that the above range is less than 0.1, then the respective numbers of the bonding structure (5), the group (6) and the terminal group (7) each bonded to $R^3$ are small so that the total number of Si is small and hence for example the adhesion lowers.

Further, the respective (I)s in the imide-amic acid chain part (1) independently represent either one of the constituting units (2), (3) or (4), and the percentage imidization falls within a range of 50 to 100% in terms of the whole of the molecule; hence the product has an increased percentage imidization in spite of precursor. Thus, for example, it is possible to effect completion of the imidization by baking at a relatively low temperature and in a relatively short time. The determination of the imide group required for deciding the percentage imidization T may be carried out according to known infrared absorption spectrum method.

The soluble polyimide-siloxane precursor of the present invention in the first aspect is constituted as described above.

Next, the raw materials of the present invention in the second aspect will be described.

Examples of the tetracarboxylic acid dianhydride expressed by the formula (10) are as follows:

pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, bis(3,4-dicarboxyphenyl)-ether dianhydride, bis(3,4-dicarboxyphenyl)-sulfone dianhydride, 1,2,5,6-naphthalenetetracarboxylic acid dianhydride, 2,3,6,7-naphthalenetetracarboxylic acid dianhydride, etc.

Further, examples of the diamine expressed by the formula (11) are as follows:

aryl diamines such as 4,4'-diaminodiphenyl ether, 4,4'-diaminodiphenylmethane, 4,4'-diaminodiphenylsulfone, 4,4'-diaminodiphenylsulfide, 4,4'-diaminodiphenyl thioether, 4,4'-di(m-aminophenoxy)diphenylsulfone, 4,4'-di(p-aminophenoxy)diphenylsufone, o-phenylenediamine, m-phenylenediamine, p-phenylenediamine, benzidine, 2,2'-diaminobenzophenone, 4,4'-diaminobenzophenone, 4,4'-diaminodiphenyl-2,2-propane, etc., aliphatic diamines such as trimethylenediamine, tetramethylenediamine, hexamethylenediamine, 4,4-dimethylheptamethylenediamine, 2,11-dodecanediamine, etc., silicic diamines such as bis(p-aminophenoxy)dimethylsilane, 1,3-bis(3-aminopropyl)-1,1,3,3-tetramethyldisiloxane, 1,4-bis(3-aminopropyldimethylsilyl) benzene, etc., alicyclic diamines such as 1,4-diaminocyclohexane and aminoalkyl-substituted aryl compounds such as o-xylenediamine, m-xylenediamine, etc.

Next, examples of aminosilicon compounds expressed by the formula (12) are as follows:

NH$_2$—(CH$_2$)$_3$—Si(OCH$_3$)$_3$,
NH$_2$—(CH$_2$)$_3$—Si(OC$_2$H$_5$)$_3$,
NH$_2$—(CH$_2$)$_3$—Si(CH$_3$)(OCH$_3$)$_2$,
NH$_2$—(CH$_2$)$_3$—Si(CH$_3$)(OC$_2$H$_5$)$_2$,
NH$_2$—(CH$_2$)$_3$—Si(C$_2$H$_5$)(On-C$_3$H$_7$)$_2$,
NH$_2$—(CH$_2$)$_4$—Si(OCH$_3$)$_3$,
NH$_2$—(CH$_2$)$_4$—Si(OC$_2$H$_5$)$_3$,
NH$_2$—(CH$_2$)$_4$—Si(CH$_3$)(OC$_2$H$_5$)$_2$,

Further, examples of the silylating agent expressed by the formula (13) are as follows:

(CH$_3$)$_3$Si(OCH$_3$), (CH$_3$)$_3$Si(OC$_2$H$_5$),
(CH$_3$)$_3$Si(On-C$_3$H$_7$)$_3$,
(CH$_3$)$_2$(C$_2$H$_5$)Si(OCH$_3$),
(CH$_3$)$_2$(C$_2$H$_5$)Si(OC$_2$H$_5$),
(CH$_3$)$_3$SiOH, (CH$_3$)$_3$Si(OCOCH$_3$),

Examples of preferable solvents for reacting the raw material compounds in a solvent in the process of the present invention (hereinafter referred to as reaction solvent) are as follows:

N-methylpyrrolidone, dimethylacetamide, dimethylformamide, dimethyl sulfoxide, tetramethylurea, pyridine, dimethyl sulfone, hexamethylphosphonoamide, methylformamide, N-acetyl-2-pyrrolidone, toluene, xylene, methyl cellosolve, ethyl cellosolve, butyl cellosolve, diethylene glycol monomethyl ether, diethylene glycol dimethyl ether, etc. These solvents may be used alone or in admixture, and also may be used in the form of a mixed solvent thereof with other solvents containing 30% by weight or more of the above solvents.

Next, the reaction process will be described.

A mols of a tetracarboxylic acid dianhydride expressed by the formula (10) are reacted with $B^2$ mols of a diamine expressed by the formula (11) and $D^2$ mols of an aminosilicon compound expressed by the formula (12) in a reaction solvent. A, $B^2$ and $D^2$ are determined so as to satisfy the expression (14) and also approximately satisfy the equation (15). The expression (14) indicates that the quantity of the aminosilicon compound used is 10% or more of the sum of the mols of the compound and the diamine. If the quantity is less than 10%, the resulting soluble polyimide-siloxane precursor, when used as surface-protecting film for semiconductors or the like, has an inferior adhesion onto silicon wafer, glass, etc.

The equation (15) refers to a relationship in the case where the total amino group in the diamine and the aminosilicon compound is equivalently reacted with the total in the tetracarboxylic acid dianhydride, but the reaction may not always be equivalently carried out. For example, if the practical number of mols of the tetracarboxylic acid dianhydride falls within the range of the theoretical number of mols thereof (A) expressed by the equation (15) ±10% thereof, it is possible to completely acquire the precursor of the present invention in the first aspect. The above terms "approximately satisfy the equation (15)" refers to such a range.

In the process of the present invention, the reaction of the respective raw materials in a solvent is carried out through a first stage reaction wherein the tetracarboxylic dianhydride is reacted with the diamine and the aminosilicon compound at a relatively low temperature, and through a second stage reaction wherein after completion of the first stage reaction, the resulting reaction fluid (hereinafter referred to often as fluid after completion of the first stage reaction) is heated in the presence of a silylating agent at a relatively high temperature to carry out the reaction along with at least water generated at that time. The quantity of the reaction solvent used is preferably 60% by weight or more based on the total weight of the solvent and raw materials added thereto, since such a quantity makes the agitating operation easy, but 98% by weight or more is unnecessary. It is preferred to employ the quantity of the reaction solvent used on view of the quantity of the total raw materials used, at the beginning of the first stage reaction, since an operation of additionally adding the solvent is no longer required.

The first stage reaction is carried out in the presence of the reaction solvent at a temperature of 0° to 60° C., preferably 3° to 30° C. and for a time of 0.2 to 6 hours. Concretely, the tetracarboxylic acid dianhydride, the diamine and the aminosilicon compound may be at the same time added to the reaction solvent to react these together, but alternatively two raw materials among the above three may be first added and reaction is initiated at a low temperature e.g. 0° to 10° C. among the above temperature range, followed by adding and reacting a remainder of the raw materials while stepwise or continuously raising the temperature to a temperature within the above temperature range. In this case, the addition order of the three raw materials has no particular limitation, but it is better not to add the diamine finally since a higher molecular weight polymer is liable to be obtained thereby. In the first stage reaction, the above three raw materials dissolve in the solvent and reaction proceeds relatively rapidly and when a uniform, transparent reaction fluid is formed, the reaction is almost complete, but it is preferred to continue the reaction for a while to ensure completion of the reaction. The reaction mainly comprises formation of a polyamide-carboxylic acid having the aminosilicon compounds bonded to both the ends thereof (hereinafter referred to often as intermediate F), as described later.

The second stage reaction is directed to a reaction wherein after completion of the first stage reaction, the reaction temperature is raised in the presence of a silylating agent expressed by the formula (13) in a quantity of E mols within the range expressed by the expression (16) and the mixture is heated to a temperature of 60° to 200° C., preferably 60° to 110° C. for a time of 0.5 to 30 hours to carry out imidization reaction, and further $X^1$ of the aminoslicon compounds at both the ends of the intermediate F and $X^2$ of the silylating compound are hydrolyzed with water generated at the imidization reaction and if necessry, water from other sources, and still further, siloxane condensation reaction is carried out. The silylating agent may be added when the second stage reaction is initiated, but alternatively it may be added together with the raw materials in advance of initiating the first stage reaction and in this case, there is no substantial influence upon the first stage reaction, and further this case is rather preferable since the operation of transferring the reaction from the first stage to the second stage is easy.

The second stage reaction comprises mainly a reaction wherein the amide-carboxylic acid part in the intermediate F formed in the first stage reaction is cyclized to imidize it, as described below, and at the same time, when $X^1$ in the aminosilicon compound constituting the terminal of the intermediate F and $X^2$ in the free silylating agent are each a hydrolyzable group i.e. alkoxy group, acetoxy group or halogen, the half quantity or more of such a hydrolyzable group is hydrolyzed into hydroxyl group (there may often be a case where $X^2$ is initially —OH), and there occurs at least partly between the intermediate Fs themselves, between the intermediate F and the silylating agent or between the silylating agents themselves, a condensation reaction of hydroxyl groups bonded to Si between each other or a condensation reaction of hydroxyl group with hydrolyzable group, to form siloxane bonds (hereinafter referred to often as siloxane condensation reaction).

As to the siloxane bond of the silylating agent between each other, the silylating agent merely forms an inert compound which is present in dissolved state in the solvent, but other siloxane bonds constitute a reticulate structure or enhance the Si content in the high-molecular compound; hence in the resulting polyimide-siloxane precursor, siloxane bonds in a considerably large quantity are not only formed at the sites of $X^1$ and $X^2$, but also when the precursor is baked, the resulting siloxane bonds are preferred to be formed at the sites of all or nearly all $X^1$s and $X^2$s of Si, and hence it is preferred to hydrolyze ½ or the whole of $X^1$ and $X^2$ to form —OH. Thus, the maximum quantity of water effective for such a hydrolysis i.e. the quantity of water consumed for hydrolyzing the whole of $X^1$ and $X^2$ is $(D^2 \times m + E)$ mols, and the quantity of water consumed for hydrolyzing $\frac{1}{2}$ of $X^1$ and $X^2$ is $(D^2 \times m + E) \times \frac{1}{2}$ mols (if $X^2$ is hydroxyl group, the quantity of water is reduced as much).

At least a part of the quantity of water consumed in the hydrolysis is covered with the quantity of water generated when the polyamic acid is imidized. The quantity of water generated is $2A \times T \times 1/100$ mols wherein T represents the percentage imidization. Thus, in the second stage reaction, the quantity of water to be added to the fluid after completion of the first stage reaction is $[\{(D^2 \times m + E) \times \frac{1}{2} \sim (D^2 \times m + E)\} - 2A \times T \times 1/100]$ mols, but if the water content in the reaction solvent used is not neglegible, it is necessary to take this water content into account. As described above, the quantity of water to be added in the second stage reaction varies depending on the quantity of water generated by the imidization, the water content in the reaction solvent and further the quantity of siloxane bonds, and there may be a case where water addition is unnecessary, depending on the quantity of water generated by the imidization or the water content in the solvent. The silylating agent is used for molecular weight modification in order to avoid that the intermediate F forms siloxane bonds between each other at both the ends thereof and endlessly develops into a high molecular weight polymer. The expression (16) indicates that the quantity of the silylating agent used, i.e. E mols are 0.01 or more in terms of $E/(D^2 \times m)$. If the quantity is less than 0.01, condensation reaction proceeds at both the ends of the intermediate F to form, through siloxane bonds, a three-dimensional polymer having a giant molecular weight, and as a result the solution loses its fluidity into gel. Further, it is not always necessary to add the silylating agent in excess of 1 in terms of $E/(D^2 \times m)$.

If the reaction temperature at the second stage is lower than 60° C., the reaction is slow and hence such a temparature is not practical. At 60° C. or higher, the reaction can be carried out without any abnormal reaction, but temperatures exceeding 200° C. are unnecessary. A promotor for imidization reaction such as tertiary amines may be added in carrying out the second stage reaction, but this is not always necessary since, in the present invention, the water generated by imidization is immediately consumed for hydrolysis to direct the reaction toward imidization and as a result the imidization reaction proceeds rapidly. An acid catalyst or the like for promoting the hydrolysis reaction may be added, but no addition is preferred taking into account its bad influence in the case where it remains.

In the second stage reaction, it is possible to allow the imidization reaction and the siloxane condensation reaction to proceed smoothly without gelling the reaction fluid, by reacting the silylating agent, and it is also possible to optionally control the viscosity of the reaction fluid i.e. the molecular weight of the precursor, by varying the quantity of the silylating agent used and the reaction conditions within the above ranges, respectively. Thus it is possible to obtain a soluble polyimide-siloxane precursor in the form of oligomer or polymer, having a suitable inherent viscosity of 0.05 to 5 dl/g, soluble in solvents and yet having a percentage imidization of 50% or more. If the inherent viscosity is less than 0.05 dl/g, the coating state of the coating fluid is inferior and hence the coating formation is insufficient. If it exceeds 5 dl/g, the polymer is difficulty soluble or insoluble and hence cannot be practically used.

As described above, by carrying out the first stage reaction followed by the second stage reaction, it is possible to obtain a soluble polyimide-siloxane precursor having a percentage imidization of 50% or more and also an inherent viscosity of 0.05 to 5 dl/g.

According to the process of the present invention, even when a polyamide-carboxylic acid having aminosilicon compounds bonded at both the ends thereof (intermediate F) obtained from a tetracarboxylic acid dianhydride, a diamine and an aminosilicon compound at a low temperature in the first stage reaction is heated in the presence of a silylating agent in the second stage reaction to effect imidization and at the same time hydrolysis and siloxane condensation reaction, the second stage reaction proceeds smoothly without causing gelation. This is because the silylating agent participates in the reaction to effect siloxane condensation, whereby the Si active site of the intermediate F between each other is inactivated to terminate an endless siloxane condensation of the intermediate F between each other. This fact will be described as follows, referring to reaction equations as an example: In this example, for simplicity of description, $H_2N$—$R^3$—$Si(OEt)_3$ (wherein OEt represents ethoxy group) is used as the aminosilicon compound, the percentage imidization is made 100% and $(CH_3)_3Si(OC_2H_5)$ is used as the silylating agent.

A tetracarboxylic acid dianhydride is reacted with a diamine as follows:

(18)

Each one of two mols of $H_2N$—$R^3$—$Si(OEt)_3$ reacts with the above product at both the ends thereof to form an intermediate F expressed by the following formula (19):

(19)

(Intermediate F)

This intermediate F is imidized by heating and at the same time water is released, as shown in the following formula (20):

tive sites, while siloxane condensation reaction successively occurs at other active sites as shown in the following formula to form a crosslinked structure and also The part enclosed by broken line in the formula (20) will hereinafter be referred to as G.

Water present in the reaction fluid including water formed herein immediately reacts with the whole or a part of $Si(OEt)_3$ at both the ends of a fresh intermediate expressed by the formula (20) to form an intermediate J expressed by the following formula (21):

(21)

(Intermediate J)

in an intermediate J formed herein readily causes siloxane condensation reaction with in another intermediate J, as shown in the following equations (22) and (23):

(22)

or (23)

Thus, the intermediate J may be regarded as a monomer having three active sites at each of both the ends thereof (six active sites in total) in this case. Accordingly, if the intermediate J is heated in the absence of the silylating agent, no reaction occurs at a part of the acmake its molecular weight giant:

This reaction occurs rapidly to make its control impossible; hence the reaction fluid gels at once. Thus, as described above, according to the prior art, no imidization has been carried out, or imidization, even when carried out, has been done at a low temperature so as to minimize the quantity of water present for example by using dehydrating agent or the like.

Whereas according to the process of the present invention, a silylating agent is made present in the second stage reaction, whereby a part of the active sites of Si is inactivated for example as shown in the following formula (24):

(24)

As shown in the above formula, the active sites subjected to siloxane condensation reaction with the sylylating agent are inactivated so that the subsequent siloxane condensation reaction is terminated. Thus, the number of crosslinks formed is restricted and also formation of giant molecular weight is prevented so that the reaction proceeds smoothly without gelling of the reaction fluid. The resulting polyimide-siloxane precursor obtained according to the above reaction under adjusted quantity of silylating agent used and reaction conditions, has a percentage imidization having already advanced to 50% or more and also a molecular weight as expressed by an inherent viscosity of 0.05 to 5 dl/g; it is soluble in solvents; and it has an enhanced Si content.

The polyimide-siloxane precursor of the invention (hereinafter abbreviated often to precursor) can be widely used as precursor for affording protecting materials, insulating materials, adhesives, etc. in the field of electronic equipments or films, structural materials, etc. In most cases, the precursor is used in the form of a solution wherein it is dissolved in a solvent, as in the case of varnishes; hence it is used preferably in a state where the solution obtained according to the process of the present invention is concentrated or diluted with a solvent (such a solution will hereinafter be referred to often as precursor solution). As such a solvent, the same as the reaction solvent may be used. For example, when the precursor solution is used as protecting material for electronic materials, the solution may be, if necessary, freed from ionic substances by means of solid adsorbent or the like and further freed from minute solid impurities by means of a filter of 1 μm or less, and the resulting solution may be used as a coating fluid. The concentration of such a coating fluid is determined depending on the thickness of coating required. It is preferably 40% by weight or less, and a range of 0.3 to 25% by weight is often particularly preferable for practical use. The coating fluid is uniformly coated on silicon wafer, glass, etc. by means of spinner or the like in conventional manner, followed by baking. The baking conditions somewhat vary depending on the solvent used, the thickness of coating, etc., but those of a relative short time of about 0.5 to 1.5 hour and a temperature of 100° to 300° C. may be sufficient. By such baking, the percentage imidization of the precursor less than 100% reaches 100%; the precursor having a not yet so large molecular weight and soluble in solvents increases in the number of crosslinks through siloxane bonds to form a solvent-insoluble, endlessly reticulate structure, and the transparent, pale-yellow color of the precursor solution turns e.g. to a transparent, brown color (but pale-yellow to colorless in the case of a thin product of several μms or less, thick) to form a very hard and highly heat-resistant coating.

The precursor obtained according to the process of the present invention, when used as a liquid crystal aligning agent, exhibits good results. Namely, when a liquid crystal is applied onto a glass plate and the precursor is then applied thereonto, followed by rubbing, then it is possible to align the liquid crystal toward a specified direction.

The soluble polyimide-siloxane precursor of the present invention has a suitable inherent viscosity and hence its solution has a suitable viscosity so that it is possible to well carry out coating. Baking of the precursor is carried out for imidizing a remaining unimidized part and also for completing siloxane condensation reaction at unreacted active sites; hence a relatively low temperature and a relatively short time may be sufficient for baking. Further, the presence of a high Si content and hence a large quantity of siloxane bonds imparts to the precursor a good coating formability on and a strong adhesion onto silicon water, glass, etc. having Si or Si compound.

Production of the polyimide-siloxane having such various performances is effected by heating the intermediate F obtained at the first stage, to a high temperature in the presence of water and a silylating agent at the second stage.

The present invention will be described in more details by way of Examples, Comparative examples and Use tests.

EXAMPLE 1

Figure 1:
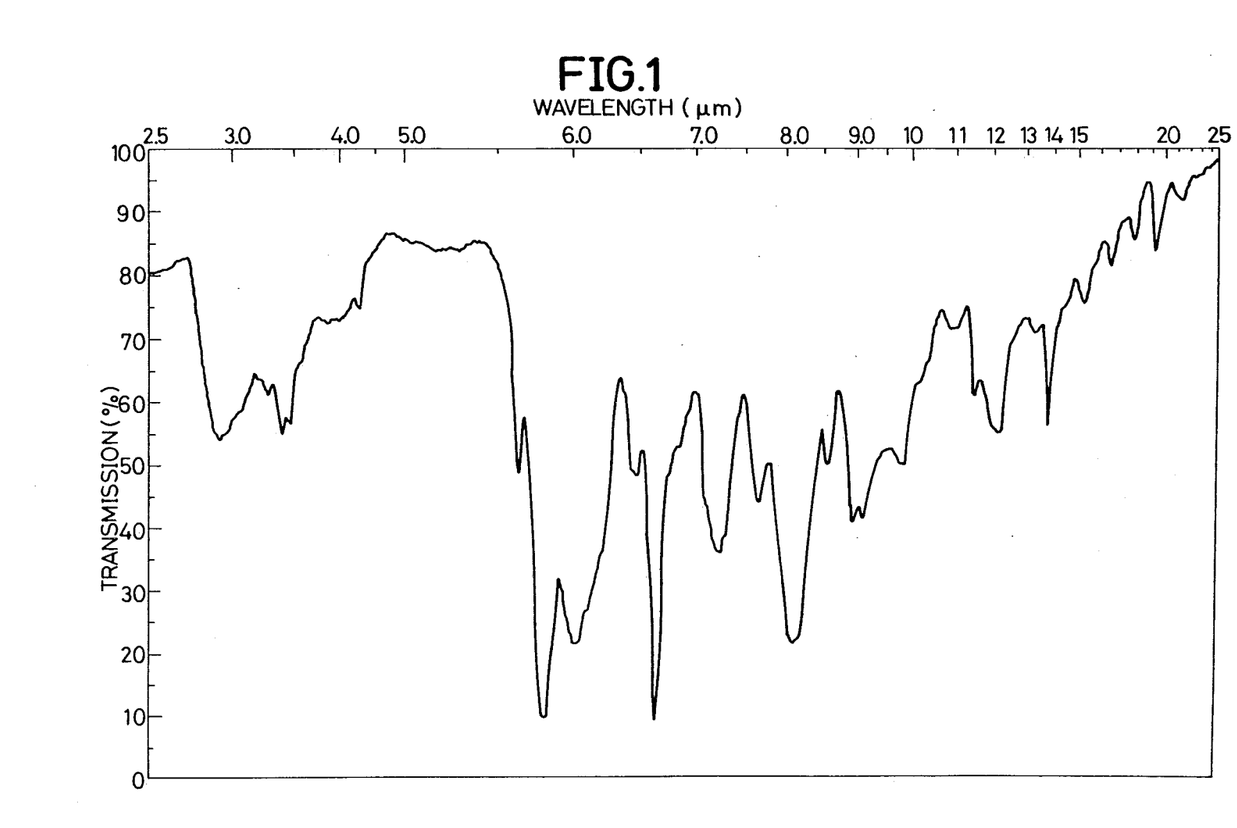
FIG. 1 shows an infrared absorption spectrum chart of a soluble polyimide-siloxane precursor obtained in Example 1 of the present invention.

A 1 l flask equipped with stirrer, dropping funnel, thermometer, condenser and nitrogen gas-purging means was fixed in cold water. Into the flask purged with nitrogen gas were fed dewatered, purified N-methyl-2-pyrrolidone (500 ml), 3-aminopropyltriethoxysilane (16.236 g, 0.0733 mol), 4,4'-diaminodiphenyl ether (22.025 g, 0.110 mol) and trimethylethoxysilane (4.338 g, 0.0367 mol), which were together dissolved with stirring, followed by gradually feeding to the resulting solution, powdery pyromellitic acid dianhydride (31.990 g, 0.147 mol) through the dropping funnel over 30 minutes and continuing reaction, during which the reaction temperature was 3° to 8° C. The reaction was further continued at the temperature for 2 hours, followed by raising the temperature to effect the reaction at 25° to 30° C. for one hour. This first stage reaction formed a pale-yellow, transparent fluid having a rotational viscosity at 25° C. of 23 cp. This rotational viscosity referred to herein means a viscosity measured at 25° C. using an E type viscometer (VISCONIC EMD, manufactured by Tokyo Keiki Company) (this definition will be applied to the following). Next the temperature of the reaction fluid was further raised and reaction was carried out at 100° C. for 9 hours (the second stage reaction) to obtain a pale-brown, transparent fluid having a rotational viscosity at 25° C. of 130 cp, that is, a solution of a soluble polyimide-siloxane precursor. A portion of this precursor solution was taken and dried at room temperature under reduced pressure to obtain a pale-brown, solid precursor having a percentage imidization of 81% as determined by its infrared absorption spectra and an inherent viscosity of 0.51. FIG. 1 shows the infrared absorption spectrum chart of the precursor obtained in this Example 1. It is observed from FIG. 1 that the absorption spectra of imide group (5.63 μm and 13.85 μm) are clearly present while the absorption spectrum of amidic acid (N-H band 3.08 μm) is extinct.

COMPARATIVE EXAMPLE 1

The first stage reaction of Example 1 was repeated employing the same apparatus and process except that no trimethylethoxysilane was added. Thereafter the temperature was further raised to 100° C. As a result the reaction fluid gelled in 50 minutes.

COMPARATIVE EXAMPLE 2

A portion (200 ml) of the reaction fluid after completion of the first stage reaction (rotational viscosity: 23 cp), obtained in the same manner as in Example 1, was taken and reaction was carried out at 40° C. for 9 hours in a nitrogen gas-purged flask same as used in Example 1, to obtain a pale-yellow, transparent varnish having a rotational viscosity at 25° C. of 19 cp. This polymer had a percentage imidization of 5% or less.

COMPARATIVE EXAMPLE 3

Employing the same apparatus and process as in Example 1, 4,4'-diaminodiphenyl ether (18.779 g, 0.0938 mol), 3-aminopropyltriethoxysilane (20.764 g, 0.0938 mol) and trimethylethoxysilane (5.548 g, 0.0469 mol) were dissolved in N-methyl-2-pyrrolidone (500 ml), followed by adding to the solution, pyromellitic acid dianhydride (30.685 g, 0.141 mol) over 30 minutes while keeping the reaction fluid at 5° to 10° C., reacting the mixture at this temperature for one hour and further at 40° to 45° C. for one hour to obtain a uniform fluid. To this reaction fluid was fed acetic anhydride (30.627 g, 0.300 mol) and the mixture was reacted at 100° C. for 5 hours to obtain a pale-brown, transparent fluid having a rotational viscosity at 25° C. of 11 cp. This polymer had an inherent viscosity of 0.03 and a percentage imidization of 100%.

COMPARATIVE EXAMPLE 4

Employing the same apparatus and process as in Example 1, 4,4'-diaminodiphenyl ether (31.261 g, 0.156 mol) and 3-aminopropyltriethoxysilane (3.292 g, 0.0149 mol) were dissolved in N-methyl-2-pyrrolidone (500 ml), followed by adding to the solution, pyromellitic acid dianhydride (35.676 g, 0.164 mol) over one hour while keeping the solution at 3° to 8° C., and reacting the mixture at this temperature for 2 hours and further at 40° to 45° C. for one hour to obtain a pale-yellow, transparent fluid (varnish). This varnish had a rotational viscosity at 25° C. of 380 cp, and this polymer had an inherent viscosity of 0.66 and a percentage imidization of 5% or less.

EXAMPLE 2

Employing the same apparatus and process as in Example 1, 4,4'-diaminodiphenyl ether (41.572 g, 0.208 mol), p-aminophenyltrimethoxysilane (88.571 g, 0.415 mol) and trimethylethoxysilane (98.189 g, 0.830 mol) were dissolved in N-methyl-2-pyrrolidone (500 ml), followed by adding to the solution, pyromellitic acid dianhydride (90.573 g, 0.415 mol) over 30 minutes while keeping the solution at 3° to 8° C., and reacting the mixture at the temperature for 2 hours and further at 45° to 50° C. for one hour to obtain a uniform fluid. The temperature of this reaction fluid after completion of the first stage reaction was further raised, followed by carrying out the second stage reaction at 120° C., for 5 hours and further for 3 hours under addition of water (3.744 g, 0.208 mol) to obtain a pale-brown, transparent solution of a polyimide-siloxane precursor having a rotational viscosity at 25° C. of 61 cp. This precursor had an inherent viscosity of 0.063 and a percentage imidization of 95%.

EXAMPLE 3

Employing the same apparatus and process as in Example 1, 4,4'-diaminodiphenyl ether (16.576 g, 0.0828 mol), 3-aminopropyltriethoxysilane (12.219 g, 0.0552 mol) and trimethylmethoxysilane (2.876 g, 0.0276 mol) were dissolved in N,N-dimethylformamide (500 ml), followed by adding to the solution, 3,3',4,4'-benzophenonetetracarboxylic acid dianhydride (35.568 g, 0.110 mol) over 30 minutes while keeping the solution at 5° to 10° C., and reacting the mixture at this temperature for one hour and further at 40° to 45° C. for one hour to obtain a uniform fluid. The temperature of the reaction fluid after completion of the first stage reaction was raised and the second stage reaction was carried out at 90° C. for 22 hours to obtain a pale-brown, transparent solution of a polyimide-siloxane precursor having a rotational viscosity at 25° C. of 97 cp. This precursor had an inherent viscosity of 0.46 and a percentage imidization of 68%.

EXAMPLE 4

Employing the same apparatus and process as in Example 1, 4,4'-diaminophenyl ether (26.350 g, 0.132 mol), 3-aminopropyltrimethoxysilane (9.433 g, 0.0526 mol) and trimethylacetoxysilane (3.477 g, 0.0263 mol) were dissolved in N-methyl-2-pyrrolidone (500 ml), followed by adding to the solution, pyromellitic acid dianhydride (34.445 g, 0.158 mol) over 30 minutes while keeping the solution at 5° to 10° C., and reacting the mixture at this temperature for 3 hours and further at 45° to 50° C. for 30 minutes to obtain a uniform first stage fluid, further raising the temperature of the first stage reaction fluid and carrying out the second state reaction at 100° C. for 10 hours to obtain a pale-brown, transparent solution of a polyimide-siloxane precursor having a rotational viscosity at 25° C. of 430 cp. This precursor had an inherent viscosity of 0.72 and a percentage imidization of 57%.

EXAMPLE 5

Employing the same apparatus and process as in Example 1, m-xylylenediamine (10.603 g, 0.0780 mol), 3-aminopropyltriethoxysilane (11.507 g, 0.0520 mol) and trimethylethoxysilane (1.538 g, 0.0130 mol) were dissolved in N-methyl-2-pyrrolidone (500 ml), followed by adding to the solution pyromellitic acid dianhydride (22.673 g, 0.104 mol) over 30 minutes while keeping the solution at 5° to 10° C., reacting the mixture at this temperature for one hour and further at 30° to 35° C. for one hour to obtain a uniform first stage fluid, raising the temperature of this first stage reaction fluid and carrying out the second stage reaction at 100° C. for 7 hours to obtain a pale-brown, transparent solution of a polyimide-siloxane precursor having a rotational viscosity at 25° C. of 41 cp. This precursor had an inherent viscosity of 0.56 and a percentage imidization of 84%.

EXAMPLE 6

Employing the same apparatus as in Example 1, 4,4'-diaminodiphenyl ether (24.567 g, 0.123 mol) and p-aminophenyltrimethoxysilane (26.171 g, 0.123 mol)

were dissolved in N-methyl-2-pyrrolidone (500 ml), followed by adding to the solution, pyromellitic acid dianhydride (40.144 g, 0.184 mol) over 40 minutes while keeping the solution at 5° to 10° C., and reacting the mixture at this temperature for 2 hours and further at 45° to 50° C. for one hour to obtain a uniform first stage fluid, adding to the first stage reaction fluid, trimethylethoxysilane (3.638 g, 0.0308 mol), raising the temperature and carrying out the second stage reaction at 100° C. for 5 hours to obtain a pale-brown, transparent solution of a polyimide-siloxane precursor having a rotational viscosity at 25° C. of 110 cp.

This precursor had an inherent viscosity of 0.33 and a percentage imidization of 78%.

EXAMPLE 7

Employing the same apparatus and process as in Example 1, 4,4'-diaminodiphenyl ether (27.889 g, 0.139 mol), 3-aminopropylmethyldiethoxysilane (7.617 g, 0.0398 mol) and trimethylethoxysilane (1.177 g, 0.00995 mol) were dissolved in N-methyl-2-pyrrolidone (500 ml), followed by adding to the solution, pyromellitic acid dianhydride (34.721 g, 0.159 mol) over 30 minutes while keeping the solution at 5° to 10° C. and reacting the mixture at this temperature for 2.5 hours and further at 30° to 35° C. for 2 hours to obtain a uniform first stage fluid, raising the temperature of the first stage reaction fluid and carrying out the second stage reaction at 100° C. for 12 hours to obtain a pale-brown, transparent solution of a polyimide-siloxane precursor having a rotational viscosity at 25° C. of 2,170 cp. This precursor had an inherent viscosity of 1.56 and a percentage imidization of 52%.

EXAMPLE 8

Employing the same apparatus and process as in Example 1, 4,4'-diaminodiphenylmethane (30.575 g, 0.195 mol), 3-aminopropyltriethoxysilane (10.769 g, 0.0486 mol) and 3-aminopropyldimethylethoxysilane (7.846 g, 0.0486 mol) and trimethylethoxysilane (4.312 g, 0.0365 mol) were dissolved in N-methyl-2-pyrrolidone (500 ml), followed by adding to the solution, 3,3',4,4'-biphenyltetracarboxylic acid dianhydride (71.553 g, 0.243 mol) over 30 minutes while keeping this solution at 5° to 10° C., and reacting the mixture at this temperature for one hour, and further at 50° to 55° C. for 2 hours to obtain a uniform first stage fluid, raising the temperature of the first stage reaction fluid and carrying out the second stage reaction at 100° C. for 6 hours to obtain a pale-brown, transparent solution of a polyimide-siloxane precursor having a rotational viscosity at 25° C. of 3,200 cp. This precursor had an inherent viscosity of 1.21 and a percentage imidization of 73%.

EXAMPLE 9

Employing the same apparatus and process as in Example 1, 4,4'-diaminobenzophenone (35.350 g, 0.167 mol), 3-aminopropyltrimethoxysilane (11.938 g, 0.0666 mol) and trimethyl-n-propoxysilane (5.909 g, 0.0500 mol) were dissolved in N-methyl-2-pyrrolidone (500 ml), followed by adding to the solution, pyromellitic acid dianhydride (43.592 g, 0.200 mol) over 30 minutes while keeping the solution at 5° to 10° C., and reacting the mixture at this temperature for 2 hours, and further at 40° to 45° C. for one hour to obtain a uniform first stage fluid, raising the temperature of the first stage reaction fluid and carrying out the second stage reaction at 100° C. for 7 hours to obtain a pale-brown, transparent solution of a polyimide-siloxane precursor having a rotational viscosity at 25° C. of 680 cp. This precursor had an inherent viscosity of 0.69 and a percentage imidization of 67%.

USE TEST 1

The following coating-baking test was carried out:

The solutions of polyimide-siloxane precursors obtained in the respective Examples and the final reaction fluids obtained in Comparative examples 2~4 were each used as a coating fluid, filtered through a filter of 1 μm, coated onto a glass plate by means of a spinner and further baked at 100° C., 200° C. or 300° C. for one hour to observe the coating condition. The results are shown in Table 1. In addition, the respective reaction fluids after completion of the first stage reaction, obtained in these Examples, that is, solutions before imidization, are indicated as Reference examples under the same numbers as those of the corresponding Examples, and the results of coating-baking test with these reaction fluids carried out in the same manner as above are also shown therein.

TABLE 1

| Test No. | Coating fluid | Baking temperature | | |
|---|---|---|---|---|
| | | 100° C. | 200° C. | 300° C. |
| | Example | | | |
| 1 | 1 | o | o | o |
| 2 | 2 | o | o | o |
| 3 | 3 | o | o | o |
| 4 | 4 | o | o | o |
| 5 | 5 | o | o | o |
| 6 | 6 | o | o | o |
| 7 | 7 | o | o | o |
| 8 | 8 | o | o | o |
| 9 | 9 | o | o | o |
| | Compar. ex. | | | |
| 10 | 2 | x | x | x |
| 11 | 3 | x | x | x |
| 12 | 4 | Δ | o | o |
| | Reference ex. | | | |
| 13 | 1 | x | x | x |
| 14 | 2 | x | x | x |
| 15 | 3 | x | x | x |
| 16 | 4 | Δ | o | o |
| 17 | 5 | x | x | x |
| 18 | 6 | Δ | o | o |
| 19 | 7 | Δ | o | o |
| 20 | 8 | Δ | o | o |
| 21 | 9 | Δ | o | o |

Note:
o: Coating is uniformly formed and has a practically sufficient hardness.
Δ: Coating is uniformly formed, but is insufficient in hardness.
x: Coating is not uniformly formed.

USE TEST 2

The following adhesion test was carried out:

Some of the coating fluids shown in Table 2 were each coated onto the surface of a slide glass by means of a spinner, followed by baking at 100° C., 200° C. or 300° C. for one hour to form a coating of 1 to 2 μm thick, treating it in a thermo-hygrostat kept at 90° C. and a relative humidity of 95% for 4 hours, notching the resulting coating into small square pieces of 2 mm sides, applying a cellophane tape onto the surface of the coating and just thereafter peeling off the tape. Adhesion of the respective coatings is expressed in terms of the number of small square pieces peeled off together with the cellophane tape at that time per 100 small square pieces prior to peeling off. The results are shown in Table 2.

TABLE 2

| Test No. | Coating fluid | Baking temperature | | |
|---|---|---|---|---|
| | | 100° C. | 200° C. | 300° C. |
| Example | | | | |
| 1 | 1 | 0 | 0 | 0 |
| 2 | 2 | 0 | 0 | 0 |
| 3 | 3 | 0 | 0 | 0 |
| 4 | 4 | 0 | 0 | 0 |
| 5 | 5 | 0 | 0 | 0 |
| 6 | 6 | 0 | 0 | 0 |
| 7 | 7 | 6 | 2 | 0 |
| 8 | 8 | 0 | 0 | 0 |
| 9 | 9 | 0 | 0 | 0 |
| Compar. ex. | | | | |
| 10 | 4 | 100 | 100 | 98 |

It is seen from the results of Tables 1 and 2 that the precursor of the present invention forms a coating having a sufficient strength and adhesion even when the baking carried out after coating the solution of the precursor is conducted under conditions of low temperatures (100°~200° C.) and short periods (about one hour).

What we claim is:

1. A soluble polyimide-siloxane precursor having an imide-amic acid chain part expressed by the formula (1)

$$-R^3-(I)-[R^2-(I)_n]_n R^3- \quad (1)$$

bonded by a bonding structure expressed by the formula (5)

$$-SiR^4{}_{3-m}Y^1{}_{m-1}-O-SiR^4{}_{3-m}Y^1{}_{m-1}- \quad (5)$$

wherein said (I)s in the number of n+1 represent independently either one of constituting units expressed by the following formulas (2), (3) and (4):

$$\begin{array}{c} \text{CO} \quad \text{CO} \\ -N \diagdown R^1 \diagdown N- \\ \text{CO} \quad \text{CO} \end{array} \quad (2)$$

$$\begin{array}{c} \text{CO} \quad \text{CONH}- \\ -N \diagdown R^1 \diagdown \\ \text{CO} \quad \text{COOH} \end{array} \quad (3)$$

$$\begin{array}{c} -\text{HNCO} \quad \text{CONH}- \\ \diagdown R^1 \diagdown \\ \text{HOOC} \quad \text{COOH} \end{array} \quad (4)$$

wherein
R$^1$ represents a tetravalent carbocyclic aromatic group;
R$^2$ represents an aliphatic group of 2 to 12 carbon atoms, an alicyclic group of 4 to 30 carbon atoms, an arylaliphatic group of 6 to 30 carbon atoms or a carbocyclic aryl group of 6 to 30 carbon atoms;
R$^3$s independently represent $-(CH_2)_s-$, $-(CH_2)_s-\phenyl$ , $-(CH_2)_s-O-\phenyl-$ or $-\phenyl-$ wherein
s represent an integer of 1 to 4;
n is defined later;
R$^4$s independently represent an alkyl group of 1 to 6 carbon atoms, phenyl group or an alkyl-substituted phenyl group of 7 to 12 carbon atoms;
Y$^1$s independently represent an alkoxy group, acetoxy group, halogen atom, hydroxyl group, $(-O-)_{\frac{1}{2}}$ or a group expressed by the following formula (6)

$$R^5R^6R^7Si-O- \quad (6)$$

wherein R$^5$, R$^6$ and R$^7$ independently represent an alkyl group of 1 to 6 carbon atoms, phenyl group or an alkyl-substituted phenyl group of 7 to 12 carbon atoms; and
ms independently represent an integer of $1 \leq m \leq 3$;
said soluble polyimide-siloxane precursor further being terminated by a group expressed by the following formula (7):

$$Y^2{}_m R^4{}_{3-m} Si- \quad (7)$$

wherein Y$^2$s independently represent an alkoxy group, acetoxy group, halogen atom, hydroxyl group or a group expressed by said formula (6); R$^4$ and m are as defined in said formula (5);
and having a percentage imidization T of 50 to 100%, this T being defined in terms of the whole of the molecule by the following equation (8):

$$T = \frac{(2W + P) \times 100}{2W + 2P + 2Q} \ (\%) \quad (8)$$

wherein
W: the total number of constituting units expressed by said formula (2);
P: the total number of constituting units expressed by said formula (3) and
Q: the total number of constituting units expressed by said formula (4);
and also having a relation expressed by the following expression (9):

$$0.1 \leq \frac{D^1}{B^1 + D^1} \quad (9)$$

wherein
B$^1$: the total number of R$^2$s, and
D$^1$: the total number of R$^3$s;
and further having an inherent viscosity of 0.05 to 5 dl/g as measured in a concentration of 0.5 g/dl in N-methyl-2-pyrrolidone at a temperature of 30±0.01° C.;
said n being an integer defined so as to give an inherent viscosity of said soluble polyimide-siloxane precursor of 0.05 to 5 dl/g.

2. A process for producing a soluble polyimide-siloxane precursor, which comprises a first step of reacting A mols of a tetracarboxylic acid dianhydride expressed by the following formula (10), $B^2$ mols of a diamine expressed by the following formula (11) and $D^2$ mols of an aminosilicon compound expressed by the following formula (12), A, $B^2$ and $D^2$ satisfying the following expression (14) and also approximately satisfying the following equation (15), in the presence of a solvent at a temperature of 0° to 60° C. for a time of 0.2 to 6 hours to effect a uniform reaction; and a second step of heating the resulting reaction material in the presence of E mols of a silylating agent expressed by the following formula (13) in the range expressed by the following expression (16) at a temperature of 60° to 200° C. for a time of 0.5 to 30 hours to effect an imidization reaction, and hydrolyzing $X^1$ in said aminosilicon compound expressed by the formula (12) and $X^2$ in said silylating agent expressed by the formula (13), with water generated during said imidization reaction and if necessary, water from other sources, and further effecting siloxane condensation, to make the percentage imidization T of the resulting product defined by the following equation (17), 50 to 100%, and also make the inherent viscosity thereof as measured in N-methyl-2-pyrrolidone in a concentration of 0.5 g/dl at a temperature of 30±0.01° C., 0.05 to 5 dl/g:

(10)

$H_2N-R^2-NH_2$ (11)

$H_2N-R^3-SiR^4_{3-m}X^1_m$ (12)

$R^5R^6R^7SiX^2$ (13)

$0.1 \leq \dfrac{D^2}{B^2 + D^2}$ (14)

$2A = 2B^2 + D^2$ (15)

$0.01 \leq E/(D^2 \times m) \leq 1$ (16)

wherein
$R^1$ represents a tetravalent carbocyclic aromatic group;
$R^2$ represents an aliphatic group of 2 to 12 carbon atoms, an alicyclic group of 4 to 30 carbon atoms, an arylaliphatic group of 6 to 30 carbon atoms or a carbocyclic aryl group of 6 to 30 carbon atoms;
$R^3$ represents $-(CH_2)_s-$, wherein s represents an integer of 1 to 4;
$R^4$, $R^5$, $R^6$ and $R^7$ each represent an alkyl group of 1 to 6 carbon atoms, phenyl group or an alkyl-substituted phenyl group of 7 to 12 carbon atoms;
$X^1$ represents an alkoxy group, acetoxy group or a halogen atom;
$X^2$ represents an alkoxy group, acetoxy group, a halogen atom or hydroxyl group; and
m represents an integer of $1 \leq m \leq 3$;

$$T = \dfrac{(2W + P) \times 100}{2W + 2P + 2Q} \ (\%) \quad (17)$$

wherein W, P and Q each represent the total number in the molecule, of the following three kinds of constituting units formed by reaction of the tetracarboxylic acid dianhydride with the diamine and/or the aminosilicon, and further, dehydration or non-dehydration:

3. A process for producing a soluble polyimide-siloxane precursor according to claim 2 wherein said second stage reaction is carried out by adding water in addition to said water generated during said second stage reaction.

4. A crosslinked polyimide-siloxane obtained by heating a soluble polyimide-siloxane precursor of claim 1 to a temperature of 100° to 300° C.

5. A crosslinked polyimide-siloxane according to claim 4 wherein said heating is carried out for a period of 0.5 to 1.5 hour.

* * * * *